US008234172B2

(12) United States Patent
Hagale et al.

(10) Patent No.: US 8,234,172 B2
(45) Date of Patent: Jul. 31, 2012

(54) SYSTEM FOR SECURING CARD PAYMENT TRANSACTIONS USING A MOBILE COMMUNICATION DEVICE

(75) Inventors: Anthony Richard Hagale, Austin, TX (US); Ryan Rozich, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 475 days.

(21) Appl. No.: 12/326,132

(22) Filed: Dec. 2, 2008

(65) Prior Publication Data

US 2009/0083160 A1 Mar. 26, 2009

Related U.S. Application Data

(63) Continuation of application No. 11/120,898, filed on May 3, 2005, now Pat. No. 7,533,047.

(51) Int. Cl.
*G06Q 20/00* (2012.01)
(52) U.S. Cl. ........................................................ 705/18
(58) Field of Classification Search .................. None
See application file for complete search history.

(56) References Cited

U.S. PATENT DOCUMENTS

| | | | |
|---|---|---|---|
| 4,998,279 A * | 3/1991 | Weiss ........................... 340/5.52 |
| 5,163,097 A * | 11/1992 | Pegg ............................... 713/183 |
| 5,326,960 A | 7/1994 | Tannenbaum .................. 235/379 |
| 5,650,604 A * | 7/1997 | Marcous et al. ............... 235/379 |
| 6,246,769 B1 * | 6/2001 | Kohut ............................ 380/45 |
| 6,249,868 B1 * | 6/2001 | Sherman et al. ............. 713/168 |
| 6,341,724 B2 | 1/2002 | Campisano |
| 6,615,194 B1 | 9/2003 | Deutsch et al. |
| 6,628,766 B1 * | 9/2003 | Hollis et al. ................ 379/114.2 |
| 7,089,208 B1 * | 8/2006 | Levchin et al. ................. 705/39 |
| 7,106,845 B1 * | 9/2006 | Zhuk et al. ............... 379/207.11 |
| 7,567,934 B2 * | 7/2009 | Flitcroft et al. .................. 705/37 |
| 7,593,896 B1 * | 9/2009 | Flitcroft et al. .................. 705/39 |
| 7,784,684 B2 * | 8/2010 | Labrou et al. ................. 235/380 |
| 2001/0051915 A1 * | 12/2001 | Ueno et al. ..................... 705/39 |
| 2002/0046246 A1 | 4/2002 | Wright et al. |
| 2002/0077983 A1 * | 6/2002 | Tagashira ........................ 705/50 |
| 2002/0091647 A1 | 7/2002 | Lopez et al. |
| 2002/0107791 A1 * | 8/2002 | Nobrega et al. ................ 705/39 |
| 2002/0133462 A1 | 9/2002 | Shteyn |
| 2002/0143708 A1 | 10/2002 | Hollander et al. |
| 2002/0184143 A1 | 12/2002 | Khater |
| 2002/0190120 A1 | 12/2002 | Pentel |
| 2003/0015589 A1 | 1/2003 | Jimenez |
| 2003/0085286 A1 * | 5/2003 | Kelley et al. .................. 235/492 |
| 2003/0128822 A1 | 7/2003 | Leivo et al. |
| 2004/0133507 A1 * | 7/2004 | Barbour ......................... 705/38 |
| 2005/0165674 A1 * | 7/2005 | Edwards et al. ................ 705/39 |
| 2006/0123465 A1 * | 6/2006 | Ziegler ............................ 726/2 |
| 2006/0190277 A1 * | 8/2006 | Zimmerman et al. ........... 705/1 |
| 2008/0154770 A1 * | 6/2008 | Rutherford et al. ............ 705/44 |

FOREIGN PATENT DOCUMENTS

| | | | |
|---|---|---|---|
| CA | 2395385 A1 * | 12/1999 |
| TW | 505873 B | 10/2002 |
| TW | 589585 B | 6/2004 |

OTHER PUBLICATIONS

Hulme, "It's Time to Clamp Down", Informationweek, No. 794, p. 42-56, Jul. 10, 2000.

* cited by examiner

*Primary Examiner* — Charles Kyle
*Assistant Examiner* — Linda Perry
(74) *Attorney, Agent, or Firm* — Mitch Harris, Atty at Law, LLC; Andrew M. Harris; Matthew W. Baca

(57) ABSTRACT

An authorization system and computer program for provision and process of a personal identification number (PIN) via a short-message-service (SMS) text message to a mobile communication device. The authorization system and computer program receive a communication from the user indicating a one-time-authorization mode. The authorization system and computer program retrieve information from a point-of-sales location and process a unique identifier for the mobile communication device. A text message is sent to the identified mobile device. The message communicates a one-time-use PIN with required PIN return via the point-of-sales system. The confirmation is processed, which authorization only occurring after confirmation. The PIN response period is voided after a short time, further improving security of the transaction.

4 Claims, 4 Drawing Sheets

SYSTEM FOR SECURING CARD PAYMENT TRANSACTIONS USING A MOBILE COMMUNICATION DEVICE

The Present application is a Continuation of U.S. patent application Ser. No. 11/120,898, filed on May 3, 2005, which issued as U.S. Pat. No. 7,533,047 on May 12, 2009, and claims the benefit of priority therefrom under 35 U.S.C. §120.

BACKGROUND OF THE INVENTION

1. Technical Field

The present invention relates generally to financial transactions where payment is made via a credit/debit card, and more specifically, to a method and system for securing card payment transactions using a mobile communication device.

2. Description of the Related Art

Credit and debit card payment systems are under increasing scrutiny as the cost of fraudulent transactions rise. Most card agreements, as well as commercial statutes, provide protection for the card user from unlimited financial loses due to fraudulent use of their card. However, the cost to financial institutions and the inconvenience and possible temporary unavailability of funds to the customer make it necessary to take steps to further secure card payment transactions.

Recent methods that have been employed to further secure card payment transactions include association of a card with a personal identification number (PIN) that is not printed on the card, and/or inclusion of additional verification numbers on the card itself. Such techniques are proof against the misappropriation of card information from copies made by an older carbon-copy type card swipe unit, but not against misappropriation of the card itself or of information entered in an electronic entry system such as an automated teller machine (ATM) or an Internet form page.

Other security methods that have been employed, typically by mail-order/telephone sellers and in some cases Internet sellers, include verification of card user information that is not available on the card at all, such as an address or telephone number associated with the card, or historical information regarding the card owner.

However, even the above techniques are not proof against deeper forms of identity theft that include acquiring knowledge of card user personal information, and with respect to Internet sites, the information used for confirmation is typically also part of the form entry data, and may be additionally present in databases on Internet servers and/or located on a user's machine, e.g., in the form of local cookies. The proliferation of card user data in present systems makes it necessary to provide further protection for both the card user and the financial institution issuing the card.

Still other techniques that have been employed to secure card transactions are the inclusion of photo identification and smart chips in or on the cards. While photo identification provides a much stronger form of protection, not all vendors are able to visually identify the customer, for example mail-order and Internet sales sites. Inclusion of a smart chip is similar to association of a PIN number with the card. Once the card itself is misappropriated, the smart chip is also obtained.

Finally, one-time use cards have been used to prevent the use of a card in one transaction from compromising card user information. Such cards are only usable once, with the consequent disadvantage that the user must obtain a card for each purchase. The one-time use cards limit the flexibility of having a payment card, and generally a card user will still have retain another card for emergency or other uses.

Therefore, it would be desirable to provide a method and system for securing card payment transactions that is not compromised by the misappropriation of the card, PIN or card user information. It would be further desirable to provide such a method and system that operates with a single re-useable card.

SUMMARY OF THE INVENTION

The above objective of securing card payment transactions is achieved in a method and system. The method and system use a physical token in the form of a mobile communications device, such as a mobile telephone, that provides confirmation of a valid transaction.

The number (or other address) of the communications device is registered with the card issuer, who associates the number (or other address) with the card. The issuer also is informed and agrees that the card is used only in a "one-time authorization" mode, which requires confirmation with the financial institution (or a trusted associate) for each transaction completed with the card.

A card transaction is initiated in a normal fashion by the card user, and when the issuer (or other transaction processing center) receives the transaction, a message is sent to the mobile communications device. The message may be a short message service (SMS) text message to a mobile telephone or other personal communications device, which can supply a PIN for use at the point of sale and/or require an interactive response, which may be entry of a PIN or simple yes/no confirmation. If the message is not interactive, a short-lived one-time use PIN can be supplied for entry at the point of sale. Otherwise, if the message is interactive, the message can require the yes/no (confirm/deny) response, a short-lived PIN or a standard PIN that is entered at the mobile communications device to confirm or deny the transaction.

The sequence is repeated for each transaction, and the authorization is either made in response to the response to the interactive message, or expires within a short predetermined time period if an interactive response is not required.

The foregoing and other objectives, features, and advantages of the invention will be apparent from the following, more particular, description of the preferred embodiment of the invention, as illustrated in the accompanying drawings.

DETAILED DESCRIPTION OF PREFERRED EMBODIMENT

The present invention provides improved card transaction security by associating a mobile communications device with a debit or credit card. The mobile communications device may be a mobile telephone, personal digital assistant (PDA), text-messaging enabled pager, or other mobile communications device capable of displaying a message and optionally accepting an interactive response.

Figure 1:
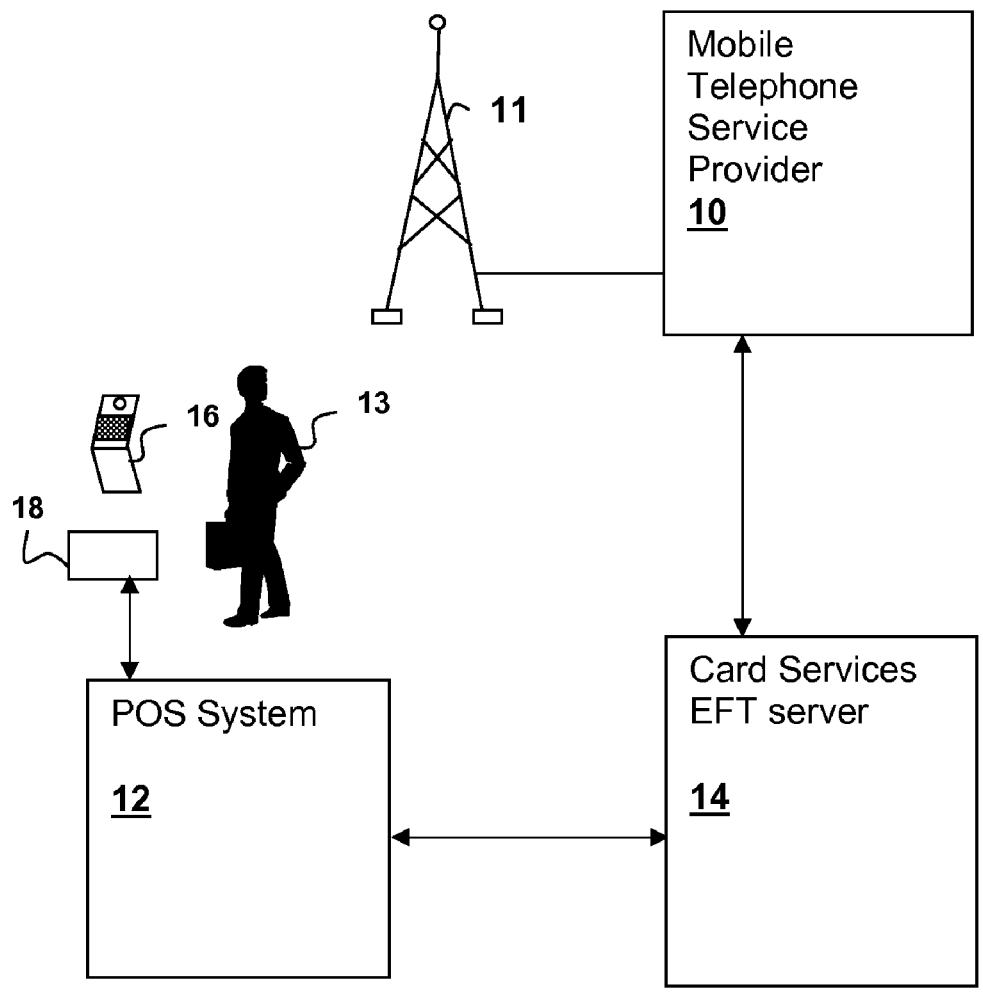
FIG. 1 is a block diagram of a system in accordance with an embodiment of the present invention.

Referring now to FIG. 1, a system in accordance with an embodiment of the present invention is shown. A card user 13 engages in a credit/debit card transaction at a point of sale (POS). A POS system 12, of the kind conventionally installed in merchant establishments, provides a terminal 18 that is accessed by card user 13 in order to pay for purchased items. POS system 12 transmits a request for authorization to card services electronic funds transaction (EFT) server 14, which in a normal operating mode will confirm or deny the transaction, depending on funds availability/credit status and authorization information.

However, card services EFT server 14 includes a one-time-authorization mode in accordance with an embodiment of the present invention. When a credit/debit card is in one-time-authorization mode (which may be a permanent state for certain types of cards or may be selectable in response to contact by the card owner with the card service provider), EFT server 14 sends a message to a mobile communications device 16 that is registered with and thereby associated with the card. Card services EFT server 14 is coupled to a mobile telephone service provider 10 that is coupled to a tower 11 including an antenna for communicating with mobile communications device 16.

The message may be an interactive short-message-service (SMS) text message that prompts the user of mobile communications device 16 for an authorization input, or may be a text or voice message conveying authorization information such as a personal identification number (PIN) for use only with the particular transaction in which card user 13 is engaged. Generally, a timer is set in response to the request for authorization at card services EFT server 14, and if an authorizing response is not received from POS system 12 at card services EFT server 14 within a predetermined time period, the transaction is denied. If the message is an interactive message, the required authorization response may be a standard permanent or semi-permanent PIN, a simple yes/no response, or the message may require re-entry of a PIN or other information transmitted within the message itself. If the message is not interactive, the message will contain authorization information, generally in the form of a short-lived PIN, that may either be entered by card user 13 into terminal 18, or provided by card user 13 to point of sale personnel for entry into POS system 12.

While the above-described system is generally for use with a mobile communications device in the possession of card user 13, the system can also be used to request authorization from a mobile device user who is generally the card owner, but not necessarily card user 13 in the illustration. For example, a parent may want to control authorization of purchases by a child, while giving them the flexibility of having a debit/credit card, or for another example, a disabled person may want to temporarily lend their card to a friend or relative to purchase items for them. Generally, applications where card user 13 is not the person in possession of mobile communications device 16, then the message will be interactive with respect to the user of mobile communications device 16 and card user 13 will not be required to supply information for authorization at terminal 18. The present invention can be used to implement a debit-card type purchase that does not require a PIN at terminal 18, or may selectively prompt for a PIN if the card is not in a one-time-authorization mode requiring a response from mobile communications device 16.

Also, while the above-described illustration uses a walk-in mercantile example, the present invention is equally applicable to other points-of-sale such as web merchants and telephone sales locations. When engaged in a purchase at one of the above-listed alternative points-of-sale, POS system 12 should be understood to be the particular POS system type that the seller is using. As long as the particular POS system 12 communicates with card services EFT server 14, the operation of the above-described system should be transparent as to the type of POS. However, with respect to the non-interactive type of authorization message, the received PIN or other authorization information is supplied to the telephone order person in the case of telephone sales, and entered in a web form in the case of a web sales system.

Figure 2:
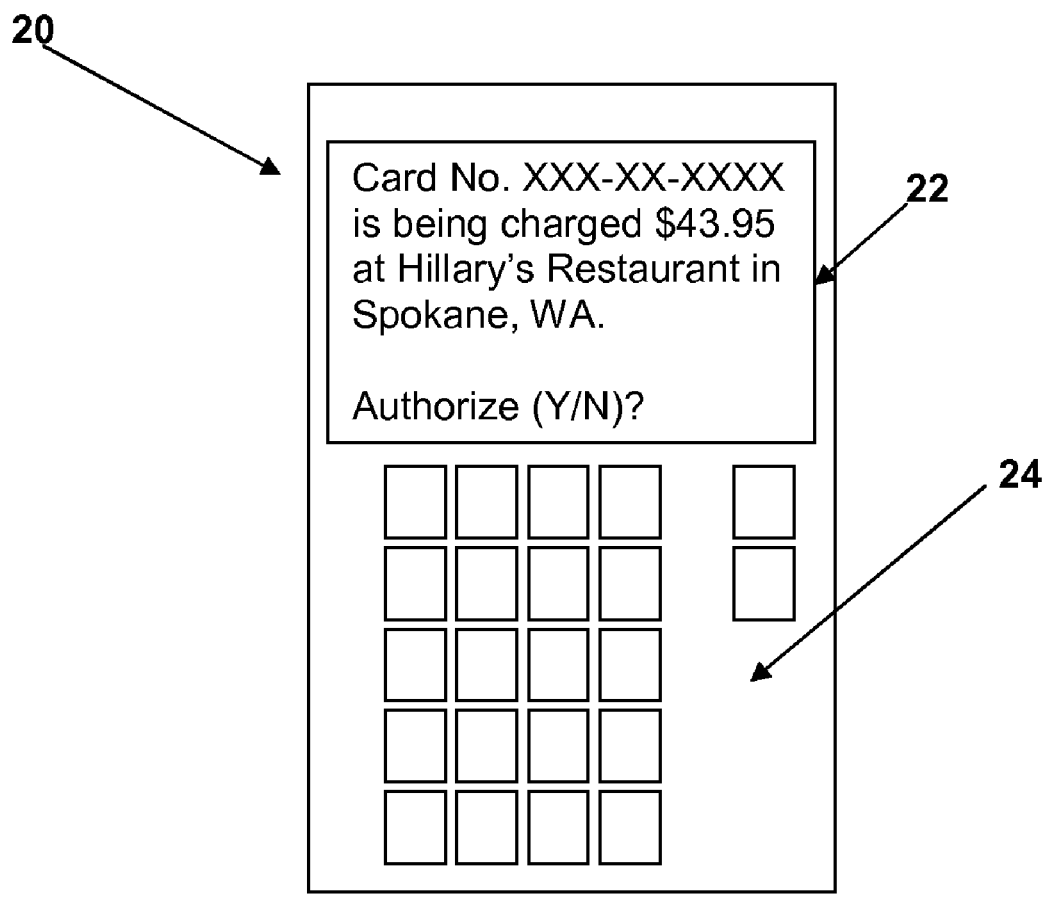
FIG. 2 is a pictorial diagram of a user interface in accordance with an embodiment of the present invention.

Referring now to FIG. 2, a user interface in accordance with an embodiment of the present invention is shown. A mobile communications device 20 includes a display 22 and an input device 24, which may be a keypad as shown, a touch screen, stylus system, or other suitable input device as generally implemented on mobile communications devices. Optionally, the input device used to authorize may be a voice recognition system as currently employed in some mobile telephones. Display 22 depicts an authorization screen in accordance with an embodiment of the present invention. The screen optionally shows transaction information as depicted, so that the card owner can tell what the card number, charged amount and funds recipient are. A yes/no authorization response is shown, but as described above, a PIN or other logical token can be included even in an interactive message, with a requirement to enter the displayed PIN or token in order to authorize the transaction. As an alternative, in particular with respect to mobile devices lacking SMS text messaging capability, the user interface can include an audio message as an alternative to the display, and response can be made via number pad entry or voice command.

Figure 3:
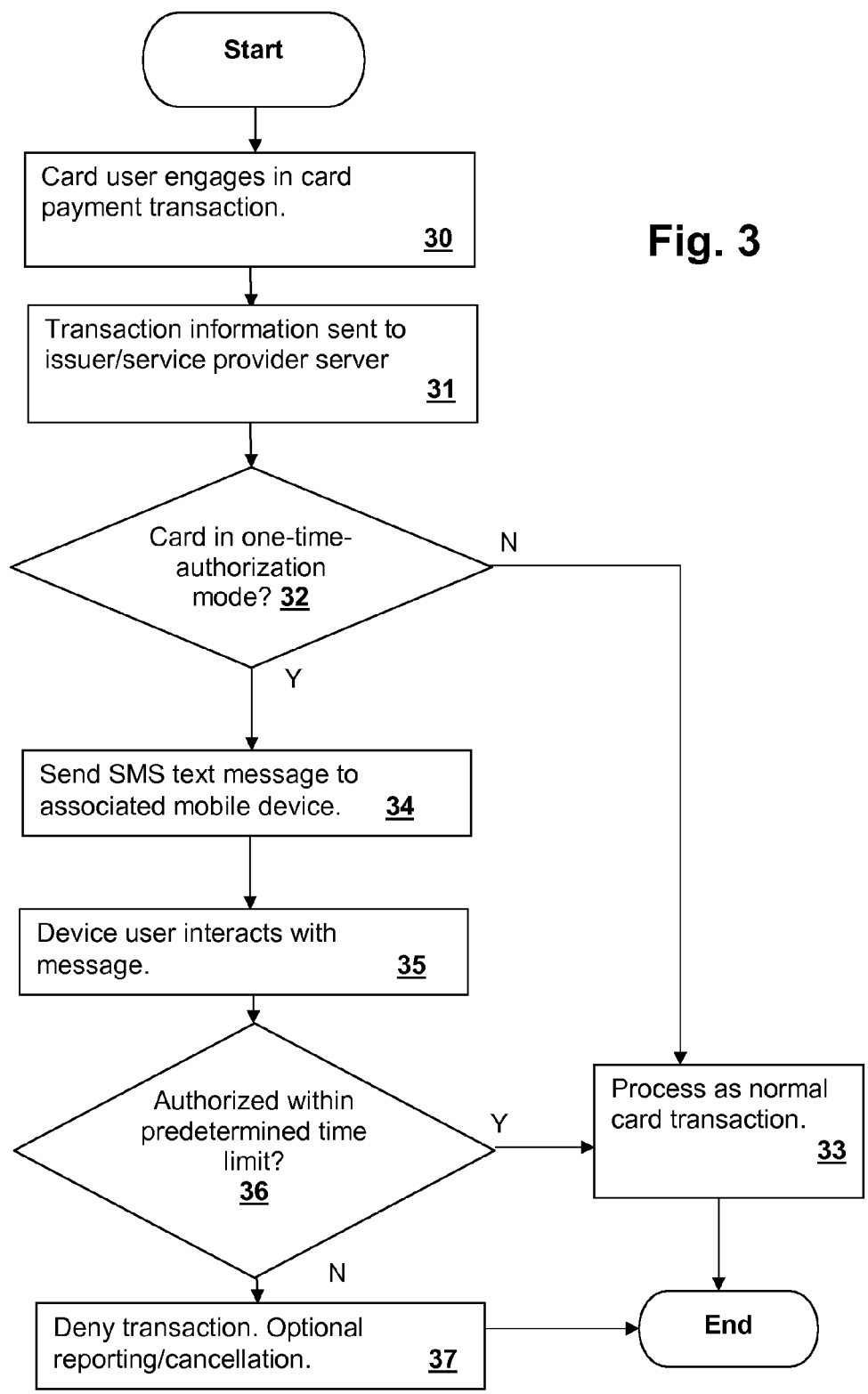
FIG. 3 is a flowchart depicting operation of a system as embodied in a method in accordance with an embodiment of the invention.

Referring now to FIG. 3, a method in accordance with an embodiment of the invention is illustrated in a flowchart. First, the card user engages in a card payment transaction (step 30) and the transaction information is sent to the card issuer or service provider server (step 31). If the card is of a one-time-authorization type or if one-time-authorization mode is selected for the card (decision 32), then an SMS text message is sent to the associated mobile communications device (step 34), otherwise the transaction is processed as a normal card transaction (step 33). The device user interacts with the text message (step 35) and the transaction is authorized within the predetermined time limit (decision 36), then the transaction is processed as normal (step 33), otherwise the transaction is denied (step 37). At this stage, an option may be presented to report the transaction as fraudulent, and/or to disable further use of the card.

Figure 4:
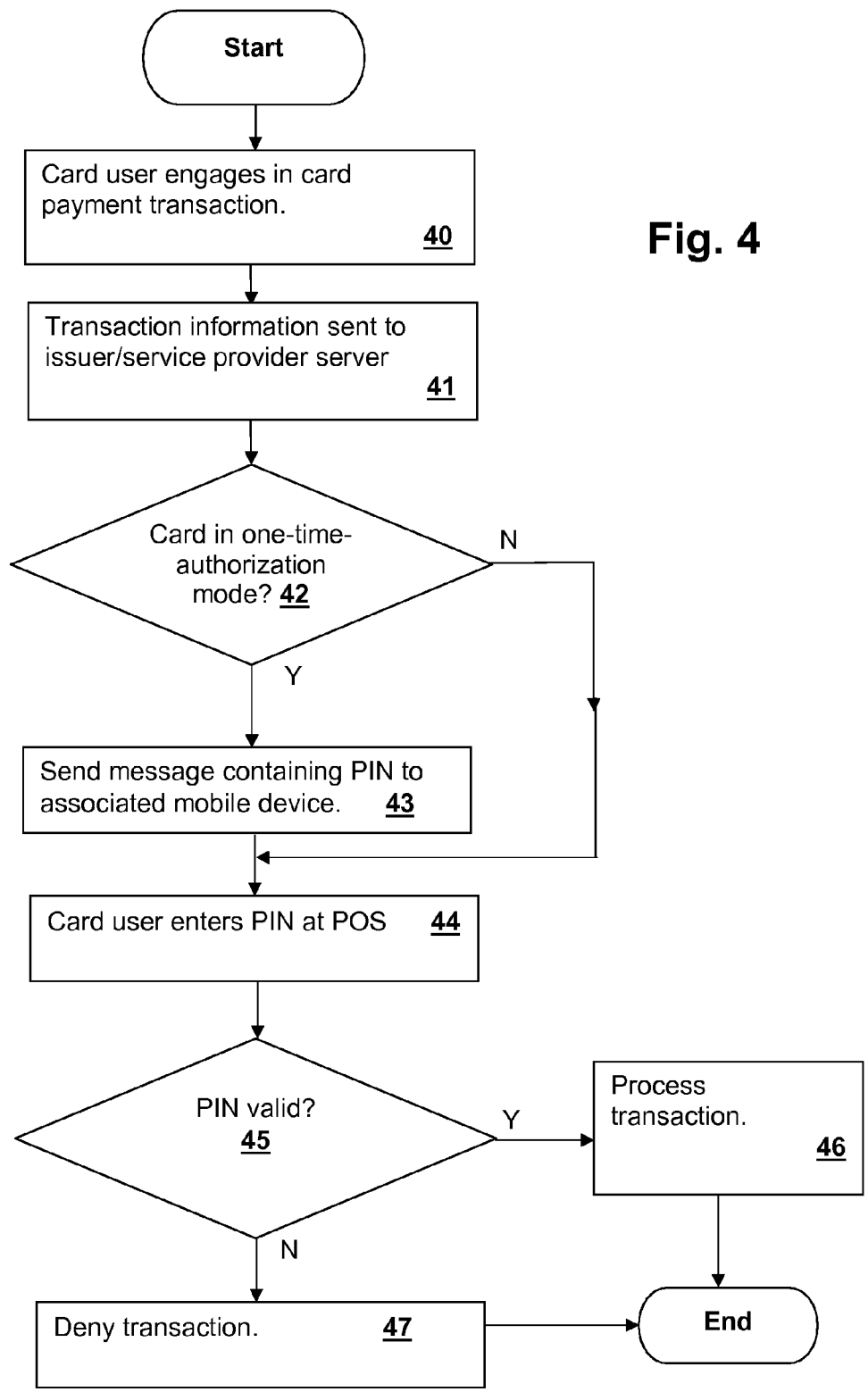
FIG. 4 is a flowchart depicting operation of another system as embodied in a method in accordance with another embodiment of the invention.

Referring now to FIG. 4, a method in accordance with another embodiment of the invention is illustrated in a flowchart. First, the card user engages in a card payment transaction (step 40) and the transaction information is sent to the card issuer or service provider server (step 41). If the card is of a one-time-authorization type or if one-time-authorization mode is selected for the card (decision 42), then an SMS text message containing a PIN is sent to the associated mobile communications device (step 43). The card user enters a PIN (step 44), which may be the received PIN for a one-time-authorized card or a standard PIN for a standard card or authorization mode and if the PIN is valid (step 45), then the transaction is processed (step 46). Otherwise, the transaction is denied (step 47). The criteria for PIN validity in step 45 may include use of the PIN within a predetermined time limit as described above.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system for authorizing transactions initiated with a payment card, comprising;

one or more servers for receiving electronic transaction information and issuing communications to mobile communications devices, said one or more servers including a point of sales system, said one or more servers each having a memory for storing program instructions, and at least one processor for executing said program instructions, said program instructions comprising program instructions for registering the payment card with an issuer of the card by providing a number or address of the mobile communications device to an issuer of the payment card, wherein the issuer associates the payment card with the number or address of the mobile communications device, program instructions for subsequent to the registering, receiving a communication from an owner of the payment card that selects whether the payment card is in a one-time-authorization mode or a normal authorization mode, whereby the owner of the payment card selects whether or not a next transaction using the payment card will be in one-time-authorization mode, program instructions for receiving a notification from a point of sales terminal located at a point of sales indicating that the next transaction has been initiated, wherein the notification is received by the point of sales system, program instructions for, within the point of sales system, determining whether the payment card is in the one-time-authorization mode or the normal authorization mode, program instructions for, in response to determining that the payment card is in the normal authorization mode, requiring input of a static multi-use personal identification number (PIN) at the point of sales terminal, and authorizing the next transaction if a static multi-use personal identification number (PIN) entered as a first input to the point of sales terminal is valid, and program instructions for, in response to determining that the payment card is in the one-time-authorization mode and further in response to receiving the notification, setting a timer and sending a message associated with the particular card transaction to a user of the particular mobile communications device via the particular mobile communications device, wherein the message contains a one-time-use personal identification number (PIN) for use in the next transaction, preventing authorization of the particular card transaction until input of the one-time use personal identification number (PIN) at the point of sales terminal has been received before the timer has expired, receiving the one-time-use personal identification number (PIN) from the user at the point of sales, entering the one-time-use personal identification number (PIN) as a second input to the point of sales terminal, wherein the point of sales system authorizes the particular card transaction only if the one-time-use personal identification number (PIN) is received from the point of sales terminal before the timer has expired.

2. The system of claim 1, wherein said program instructions for sending comprise program instructions for sending a short message service (SMS) text message to the particular mobile communications device.

3. A computer program product comprising a tangible computer-readable media storing program instructions for execution on one or more servers, wherein the program instructions are program instructions for receiving electronic transaction information and issuing communications to mobile communications devices, wherein said program instructions are program instructions for authorizing transactions initiated with a payment card, said program instructions comprising program instructions for:

registering the payment card with an issuer of the card by providing a number or address of the mobile communications device to an issuer of the payment card, wherein the issuer associates the payment card with the number or address of the mobile communications device;

subsequent to the registering, receiving a communication from an owner of the payment card that selects whether the payment card is in a one-time-authorization mode or a normal authorization mode, whereby the owner of the payment card selects whether or not a next transaction using the payment card will be in one-time-authorization mode;

receiving a notification from a point of sales terminal located at a point of sales indicating that the next transaction has been initiated, wherein the notification is received by a point of sales system;

within the point of sales system, determining whether the payment card is in the one-time-authorization mode or the normal authorization mode;

in response to determining that the payment card is in the normal authorization mode, requiring input of a static multi-use personal identification number (PIN) at the point of sales terminal, and authorizing the next transaction if a static multi-use personal identification number (PIN) entered as a first input to the point of sales terminal is valid; and in response to determining that the payment card is in the one-time-authorization mode and further in response to the receiving of the notification, setting a timer and sending a message associated with the particular card transaction to a user of the particular mobile communications device via the particular mobile communications device, wherein the message contains a one-time-use personal identification number (PIN) for use in the next transaction, preventing authorization of the particular card transaction until input of the one-time use personal identification number (PIN) at the point of sales terminal has been received before the timer has expired, receiving the one-time-use personal identification number (PIN) from the user at the point of sales, entering the one-time-use personal identification number (PIN) as a second input to the point of sales terminal, wherein the point of sales system authorizes the particular card transaction only if the one-time-use personal identification number (PIN) is received from the point of sales terminal before the timer has expired.

4. The computer program product of claim 3, wherein said program instructions for sending comprise program instructions for sending a short message service (SMS) text message to the particular mobile communications device.

* * * * *